(No Model.)
C. R. PRATT.
BALL BEARING NUT.
No. 476,304. Patented June 7, 1892.
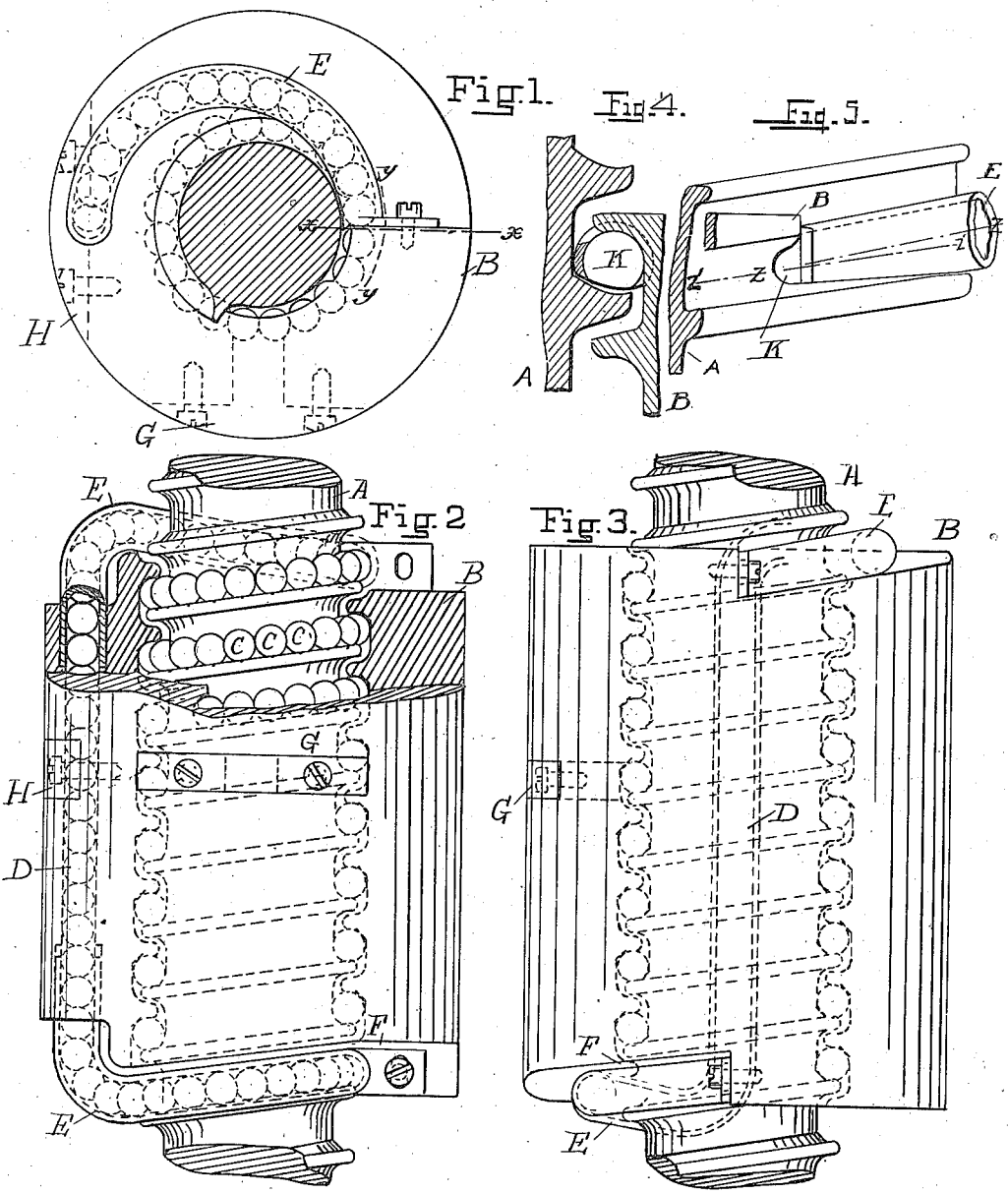
Witnesses:
S. W. Balch
Galusha B. Balch
Inventor,
Chas. R. Pratt,
Thomas Ewing, Jr.
Attorney.

UNITED STATES PATENT OFFICE.

CHARLES R. PRATT, OF NEW YORK, N. Y., ASSIGNOR TO THE SPRAGUE ELECTRIC ELEVATOR COMPANY, OF SAME PLACE.

BALL-BEARING NUT.

SPECIFICATION forming part of Letters Patent No. 476,304, dated June 7, 1892.

Application filed November 16, 1891. Serial No. 412,026. (No model.)

*To all whom it may concern:*

Be it known that I, CHARLES R. PRATT, a citizen of the United States of America, and residing in the city, county, and State of New York, have invented certain new and useful Improvements in Ball-Bearing Nuts, of which the following is a specification.

My invention is an improvement in ball-bearing nuts; and it consists in attaching a tube to the nut as a return-passage for the balls and in means provided for inserting and removing the balls.

Figure 1 is an end view. Fig. 2 is a view partly in section and partly in elevation; and Fig. 3 is a side view taken at right angles to Fig. 2. Fig. 4 is a cross-section on the line $x\ x$ of Fig. 1. Fig. 5 is an elevation along the line $y\ y$, Fig. 1.

The ball-nut is of the general type. A is a screw; B, the nut; C C C, the balls.

The complete passage-way for the balls is herein called the "ballway," the part of the ballway between the threads being called the "threaded way" and the other part the "return-way." Through the nut is bored a straight passage D, parallel to the screw, into which a tube is slipped. Leading from the two ends of this passage D to the extremities of the threaded way are tubes E E, which are bent between the extremities of passage D and the threaded way, so as to enter the latter tangentially. These tubes abut against the walls of the nut at the points where the thread of the nut runs out, as is best shown in Figs. 4 and 5. On the side next to the wall of the nut there is in the end of the tube a projection K, which extends outward toward the balls in the nut and between the threads of the nut and screw. This projection on the tube and the wall of the nut guides the balls at the approaches of the tubes while the balls are held between the threads of the nut and screw. Thus the balls are guided with precision into and out of the screw-section. There should be a small space for the adjustment of the tube in position along the length of the nut at the point where the tube abuts against the wall of the nut to compensate for wear in the nut-thread. This space is secured by cutting away the nut at the end of its thread, as shown at F, Fig. 3. In Fig. 5 there is not enough of the nut shown to indicate how it is cut away, but it is clear that the tube E is adjustable so as to bring its mouth directly opposite the end of the threaded way. Since on entering or leaving the threaded way the balls must pass across the edge of the thread of the screw, they must be lifted over the ridge formed by the wear of the balls in the screw-thread. In order to lift the balls out of their groove over this ridge, the tube is deflected slightly in the tangent plane from the angular pitch of the screw, so as to carry the path of the balls away from the screw-thread. This is shown in Fig. 5, where the dotted line $z'\ z'$ is a tangent drawn in the regular pitch of the screw, and dotted line $z\ z$ is the axis of the tube and makes a small angle with the line $z'\ z'$—that is, the tube is shown in Fig. 5 as tilted up slightly at its outer right-hand end, so that, though it lies in the tangent plane, it lifts the ball sufficiently to carry it over the rim on the thread of the screw.

With a very hard screw and nut in which there is but little wear the adjustment of the tube with respect to the nut and the change in this direction with respect to the screw above mentioned may be unnecessary, since the clearance between the walls and the tube required to insure free passage of the balls may be sufficient provision for all wear; but as this clearance, in order to prevent jamming of the balls, should not be more than about one-sixteenth of their diameter, the above adjustments are necessary in case there is considerable wear of the nut and the screw.

The two return-way tubes E E, separate from the body of the nut, open into the threaded way, and must of course be connected at their inner ends—*i. e.*, the ends opposite to those opening into the threaded way—in order to form a complete return-way for the balls. I prefer to connect them by a passage, as D, through the body of the nut, but the passage D through the nut may be omitted and the return-way lie entirely outside of the nut. It may be one continuous tube, and it is not necessary to insert a tube in the passage D, as this passage can be counterbored at its extremities to allow for the thickness of the walls of the tubes E E.

It is obvious that a return-passage can be constructed much more cheaply in the manner herein described than by the method at present used of cutting it in part out of the solid body of the nut and piecing up around the ends to complete the passage, and the gain is particularly large in high-speed mechanism, where the nut travels rapidly along the screw and in which the ballway must be made with a high degree of accuracy.

The balls are inserted in the ballway of nuts of ordinary construction by carrying the nut out to and somewhat beyond the end of the screw-shaft, turning the shaft on end, with the nut on top, filling the projecting end of the nut with balls, and slowly revolving the nut or shaft in such direction as to carry the nut back onto the shaft. The improved nut shown has this advantage, that by removing one of the tubes E E an opening is made in the ballway, and the nut can be filled while in place on the shaft by introducing balls into the return-way or threaded way; but it is more convenient to make an insertion through the wall of the nut either into the threaded way, as shown at G, or into the part of the return-way marked D, as shown at H, or an opening can be made through the wall of one of the tubes E. The opening is normally closed by a removable piece fastened in place by screws or otherwise. In such an opening the nut is readily filled or emptied by oscillating or revolving the nut or screw.

Though I have shown in the drawings a ball-nut in which the balls lie between threads on a nut and a screw, my improvements are equally applicable to all styles of ball-nuts.

What I claim, and desire to secure by Letters Patent, is—

1. A ball-bearing nut having a threaded way through solid metal and provided at each end with a separate return-way tube opening into the threaded way and a connection between the inner ends of said tubes, substantially as described.

2. A ball-bearing nut having a threaded way through solid metal and provided at each end with a separate return-way tube opening into the threaded way and a connection between the inner ends of said tubes, with an opening for the insertion of balls into the return-way, and means for closing said opening, substantially as described.

Subscribed by me in New York city, New York, this 14th day of November, 1891.

CHAS. R. PRATT.

In presence of—
THOMAS EWING, Jr.,
CARY T. HUTCHINSON.